(12) United States Patent
Boyko et al.

(10) Patent No.: US 9,827,974 B1
(45) Date of Patent: Nov. 28, 2017

(54) METHODS AND SYSTEM FOR POSITIONING AN ENGINE

(71) Applicant: Ford Global Technologies, LLC, Dearborn, MI (US)

(72) Inventors: Anthony Boyko, Windsor (CA); Alexander O'Connor Gibson, Ann Arbor, MI (US); Jarret Zablocki, St. Clair Shores, MI (US); Scott Steadmon Thompson, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/263,003

(22) Filed: Sep. 12, 2016

(51) Int. Cl.
*B60W 20/00* (2016.01)
*F02D 41/04* (2006.01)
*F02D 41/26* (2006.01)
*B60W 20/12* (2016.01)
*F02N 11/08* (2006.01)
*B60W 10/06* (2006.01)

(52) U.S. Cl.
CPC ............ *B60W 20/12* (2016.01); *B60W 10/06* (2013.01); *F02D 41/042* (2013.01); *F02D 41/26* (2013.01); *F02N 11/0851* (2013.01); *F02N 11/0862* (2013.01); *Y10S 903/905* (2013.01)

(58) Field of Classification Search
CPC ... B60W 20/12; B60W 10/06; F02N 11/0862; F02N 11/0851; F02D 41/042; F02D 41/26; Y10S 903/905
USPC ...................................................... 701/22, 99
See application file for complete search history.

(56) References Cited

U.S. PATENT DOCUMENTS

| | | | |
|---|---|---|---|
| 7,167,793 B1 | 1/2007 | Gibson et al. | |
| 7,624,712 B1 | 12/2009 | Pursifull | |
| 2007/0124037 A1* | 5/2007 | Moran | B60K 6/12 701/22 |
| 2010/0145562 A1* | 6/2010 | Moran | B60K 6/46 701/22 |
| 2013/0297114 A1* | 11/2013 | Doering | B60W 10/196 701/22 |
| 2013/0297122 A1* | 11/2013 | Gibson | B60W 20/40 701/22 |
| 2015/0266469 A1* | 9/2015 | Gibson | F02N 11/006 701/22 |

\* cited by examiner

*Primary Examiner* — Tyler J Lee
(74) *Attorney, Agent, or Firm* — David Kelley McCoy Russell LLP (57) ABSTRACT

Systems and methods for positioning an engine during engine stopping and during vehicle activation are described. In one example, a belt integrated starter/generator rotates an engine before the engine is started to reduce engine starting time and determine engine position before the engine is started. The engine may be rotated to a first or second position based on a destination of the vehicle.

20 Claims, 7 Drawing Sheets

METHODS AND SYSTEM FOR POSITIONING AN ENGINE

FIELD

The present description relates to methods and a system for operating a hybrid powertrain that includes an engine and an electric machine to propel a vehicle. The methods and systems may be particularly useful for hybrid vehicles that include an engine and a belt integrated starter/generator and/or a motor/generator.

BACKGROUND AND SUMMARY

An internal combustion engine may be selectively stopped and started while a vehicle is activated. It may be desirable to know engine position when the engine is restarted so that fuel may be delivered to engine cylinders in a timely manner so that engine cylinders do not receive multiple fuel injections when only one fuel injection is desired. Further, by injecting fuel to engine cylinders at known engine positions, engine emissions may be reduced and engine starting consistency may be provided. However, if a vehicle is deactivated it may not be assured that the engine starts from an engine position last determined by the engine's controller while the engine was being stopped. For example, the engine position sensors may not be sensitive to zero engine speed. Consequently, the last sensed engine position may not be the engine's stopped position. Further, the engine's stopping position may be changed from a first stop position if the vehicle includes a clutch to engage the engine to the vehicle's wheels and vehicle brakes are released while the vehicle is parked on a hill. For these reasons, it may be desirable to rotate the engine and establish the engine's position before supplying spark and fuel to the engine. By rotating an engine that was stopped, engine position may be established before spark and fuel are supplied to the engine so that fuel and spark may be timely supplied to the engine. However, the engine may have to be rotated at cranking speed for a longer time than is desired if engine position cannot be established from engine position sensor information in a timely manner. As a result, it may take more than a desired amount of electrical energy to rotate the engine before the engine is started. Further, engine starting time may be increased.

The inventors herein have recognized the above-mentioned issues and have developed an engine operating method, comprising: after stopping an engine, rotating the engine via an electric machine to a first position and then stopping engine rotation in response to activating a vehicle and the vehicle being within a predetermined distance of a destination.

By rotating an engine via an electric machine after stopping the engine, it may be possible to determine engine position in case the engine is started during a vehicle activation period. The vehicle activation period may be a time from a time an operator enters a vehicle until the operator exits the vehicle. The vehicle may be propelled via an electric machine or an engine during the vehicle activation period. The engine may be rotated to a first position via an electric machine where engine position may be determined if the vehicle is traveling to a destination of the vehicle that is in range of the vehicle when the vehicle is propelled solely via an electric machine using energy stored in an electric storage device via a stationary power grid and one charging cycle. The engine may be rotated to a second position via the electric machine if the vehicle is traveling to a destination that is beyond the range the vehicle may travel when propelled solely via the electric machine using energy stored in an electric storage device via a stationary power grid and one charging cycle. Rotating the engine to the second position may reduce engine starting time while rotating the engine to the first position may reduce an amount of electrical energy consumed to rotate the engine via the electric machine.

The present description may provide several advantages. For example, the approach may reduce engine starting time. Further, the approach may reduce electrical energy consumption for short trips. Further still, the approach may provide quicker starting as compared to if the engine is left at a random engine stop position when engine starting may not be expected.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
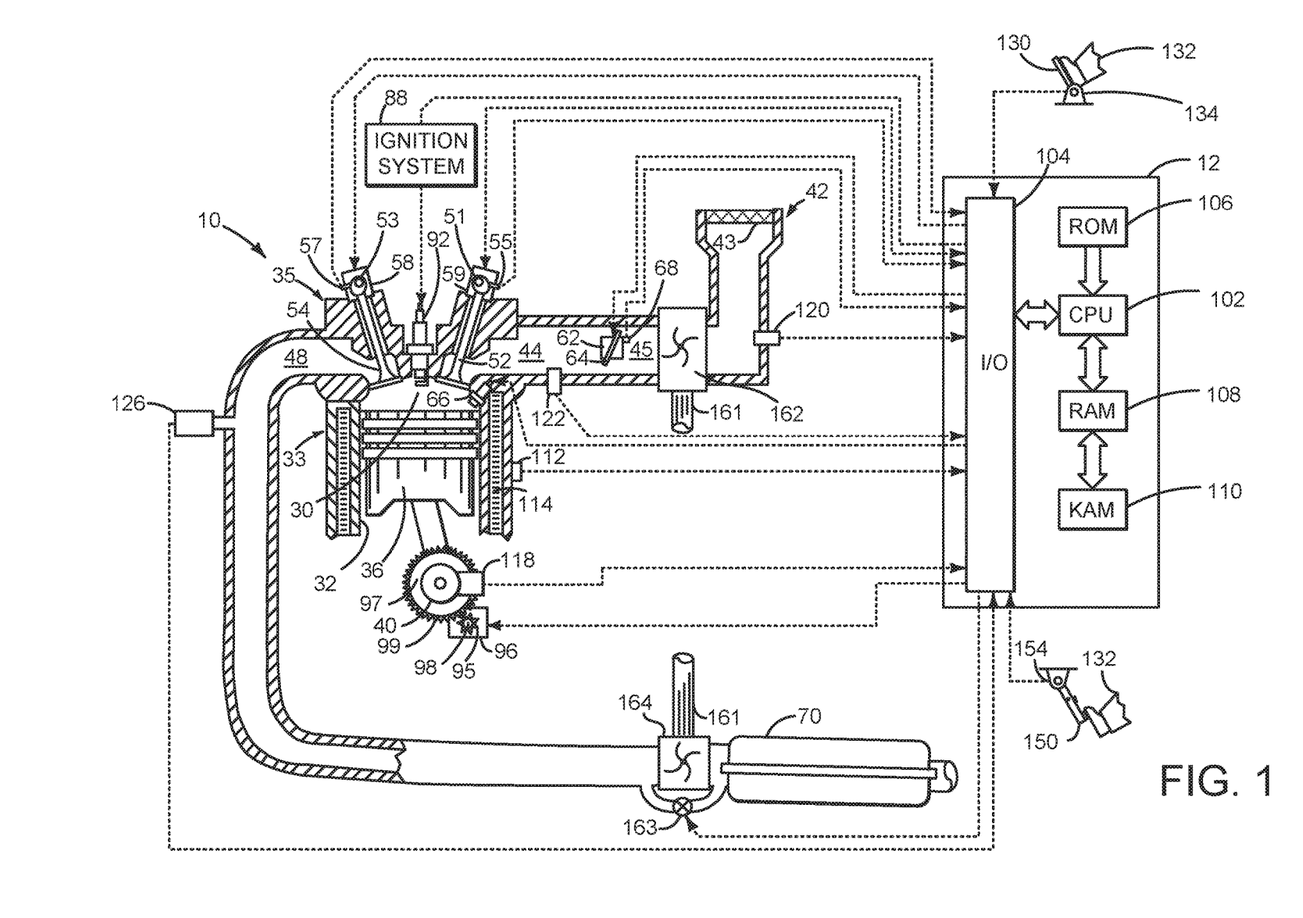
FIG. 1 is a schematic diagram of an engine.
Figure 2:
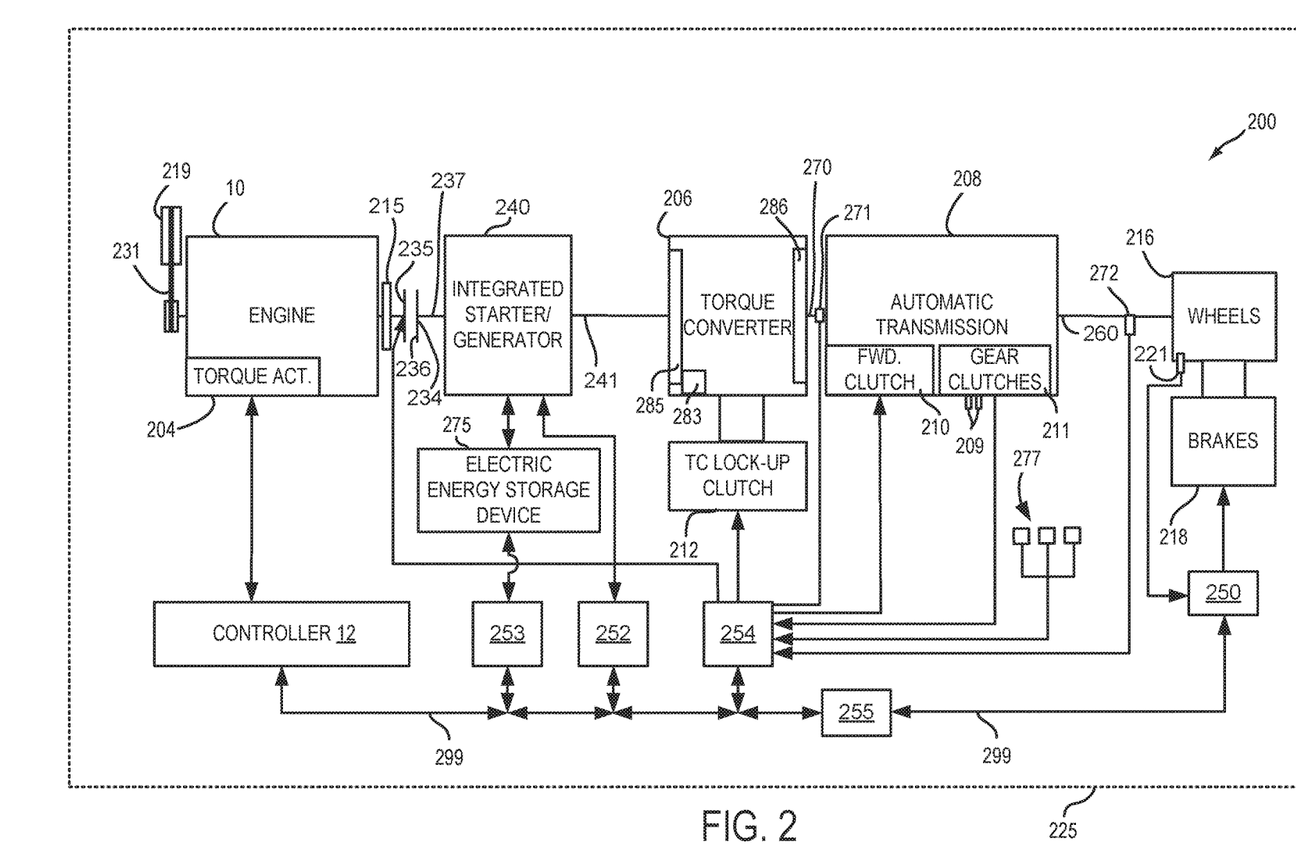
FIG. 2 is a schematic diagram of a hybrid vehicle driveline.
Figure 3:
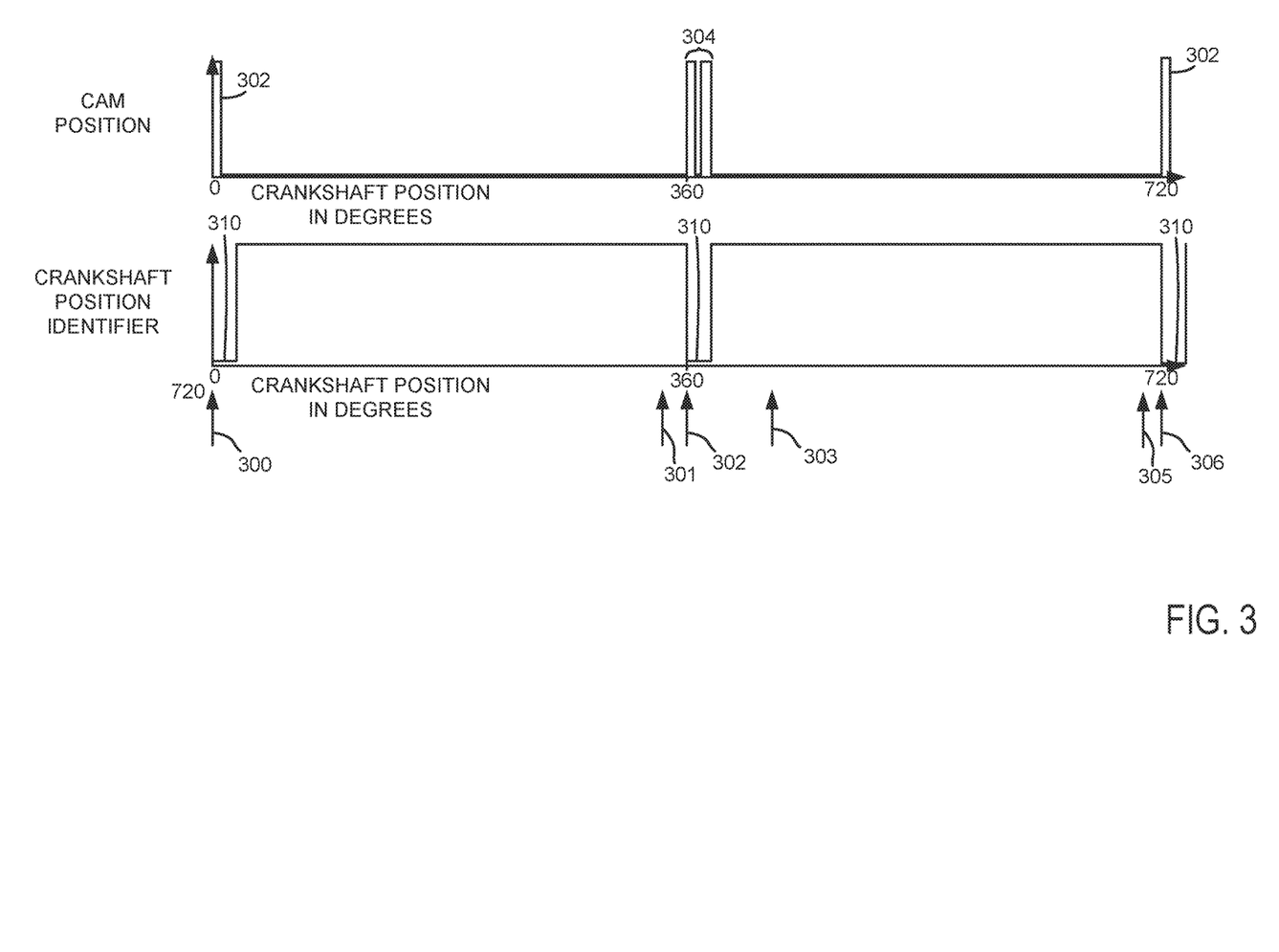
FIG. 3 shows example plots illustrating engine position indicating signals for synchronizing an engine controller with an engine.

The present description is related to controlling starting and stopping of a hybrid vehicle. The hybrid vehicle may include an internal combustion engine as shown in FIG. 1. The internal combustion engine may be included in a driveline or powertrain of a hybrid vehicle as shown in FIG. 2. Engine position may be established via engine position signals as shown in FIG. 3. The hybrid powertrain may be operated according to the method of FIGS. 4-6. The methods of FIGS. 4-6 may provide the vehicle operating sequence shown in FIG. 7.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine)

includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake camshaft 51 and an exhaust camshaft 53. The position of intake camshaft 51 may be determined by intake camshaft sensor 55. The position of exhaust camshaft 53 may be determined by exhaust camshaft sensor 57. Intake valves may be held open or closed over an entire engine cycle as the engine rotates via intake valve operator 59, which may electrically, hydraulically, or mechanically operate intake valves. Exhaust valves may be held open or closed over an entire engine cycle as the engine rotates via exhaust valve operator 58, which may be electrically, hydraulically, or mechanically operate exhaust valves.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via belt driven integrated starter/generator (BISG) 219, or via driveline integrated starter/generator (ISG) 240 also known as a motor/generator. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

BISG is mechanically coupled to engine 10 via belt 231. BISG may be coupled to crankshaft 40 or a camshaft (e.g., 51 or 53). BISG may operate as a motor when supplied with electrical power via electric energy storage device 275. BISG may operate as a generator supplying electrical power to electric energy storage device 275.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 has a higher output torque capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device.

Vehicle system controller 255 then allocates a fraction of the requested driver demand torque to the engine and the remaining fraction to the ISG or BISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

In other examples, engine 10 may be coupled to an electric dynamometer that rotates engine 10 while it is not receiving fuel. In still other examples, engine 10 may be in communication with a motor of a parallel or series hybrid driveline. Thus, camshaft timing for a non-reference engine may be revised in different settings.

Thus the system of FIGS. 1 and 2 provides for a system, comprising: an engine; an integrated starter/generator selectively coupled to the engine via a driveline disconnect clutch; a transmission couple to the integrated starter/generator; and a vehicle system controller including executable instructions stored in non-transitory memory to rotate the engine to a first stopping position based on a vehicle destination or a second position based on the vehicle destination. The system includes where the first stopping position is based on the vehicle destination being less than a threshold distance from a vehicle in which the engine resides. The system includes where the second stopping position is based on the vehicle destination being greater than the threshold distance from the vehicle in which the engine resides. The system also includes where the threshold distance is based on an amount of energy stored in an electric energy storage device. The system further comprises a belt integrated starter generator and additional instructions to rotate the engine via the belt integrated starter generator. The system further comprising additional instructions to rotate the engine in a reverse direction in response to the engine not starting during a vehicle activation period.

Referring to FIG. 3, plots showing prophetic signals based on camshaft position sensors and crankshaft position sensors. The first plot from the top of FIG. 3 is a plot of camshaft position sensor voltage versus engine position. The sequence starts from the left and proceeds to the right as time advances. The second plot from the top of FIG. 3 is a plot of crankshaft position sensor voltage versus engine position. The sequence starts from the left and proceeds to the right as time advances.

Camshaft position is indicated by a single pulse 302 at 0 crankshaft degrees and two pulses 304 at 360 crankshaft degrees provided via a camshaft position sensor. Of course, camshaft position may be indicated via alternative pulse train patterns. The engine position advances from left to right (e.g., 0 crankshaft degrees to 360 crankshaft degrees).

Crankshaft position is indicated by low level signal 310 provided via a crankshaft position sensor, and the low level signal 310 repeats every 360 crankshaft degrees as shown at 0, 360, and 720 crankshaft degrees. Compression stroke top-dead-center for cylinder number one may be at 0 and 720 crankshaft degrees since the engine is a four stroke engine with a cycle that repeats every two engine revolutions. The falling edges provide an indication of crankshaft position of 0 and 360 degrees. Additional pulses may be included in the interval between pulses 310 to provide higher crankshaft position resolution. Further, additional or fewer pulses or missing pulses may be used to locate crankshaft position.

In this example, engine position may be established at 0 crankshaft degrees 300 or at 360 crankshaft degrees 302. Note that 720 crankshaft degrees is equivalent to 0 crankshaft degrees. Engine position may be established at 0 crankshaft degrees since the camshaft sensor provides a single pulse 302 and the crankshaft sensor provides low level 310 for the duration of the single pulse. Engine position may also be established at 360 crankshaft degrees since the camshaft sensor provides two pulses 304 and the crankshaft sensor provides low level 310 for the duration of the two pulses. If the engine starts rotating at location 301, the first engine position that provides signals from which engine position may be established following a last engine stop at 301 is location 302, or 360 crankshaft degrees since engine position advances from left to right. If the engine starts rotating at location 303, the first engine position that provides signals from which engine position may be established following a last engine stop at 303 is location 306, or 720 crankshaft degrees. Location 305 is an engine stopping location for determining engine position at 306 early after beginning engine cranking. The engine rotates in a forward direction when moving from 0 crankshaft degrees to 360 crankshaft degrees.

The camshaft position signal and crankshaft position signal may not be available at low engine speeds. Further, once the engine position is determined at 302 or 306 and engine rotation is stopped, the engine may have to be rotated backward (e.g., from 302 to 301) than forward (e.g., from 301 to 302) after the vehicle is deactivated so that engine position may be determined via rotating the engine from 301 to 302 in a short crankshaft interval. Alternatively, the engine may be rotated forward from 302 to 306 to reestablish engine position after vehicle deactivation since engine position may not be reliably determined based on the engine's last or most recent past stop position and because the engine may have rotated while the vehicle was deactivated.

Figure 4:
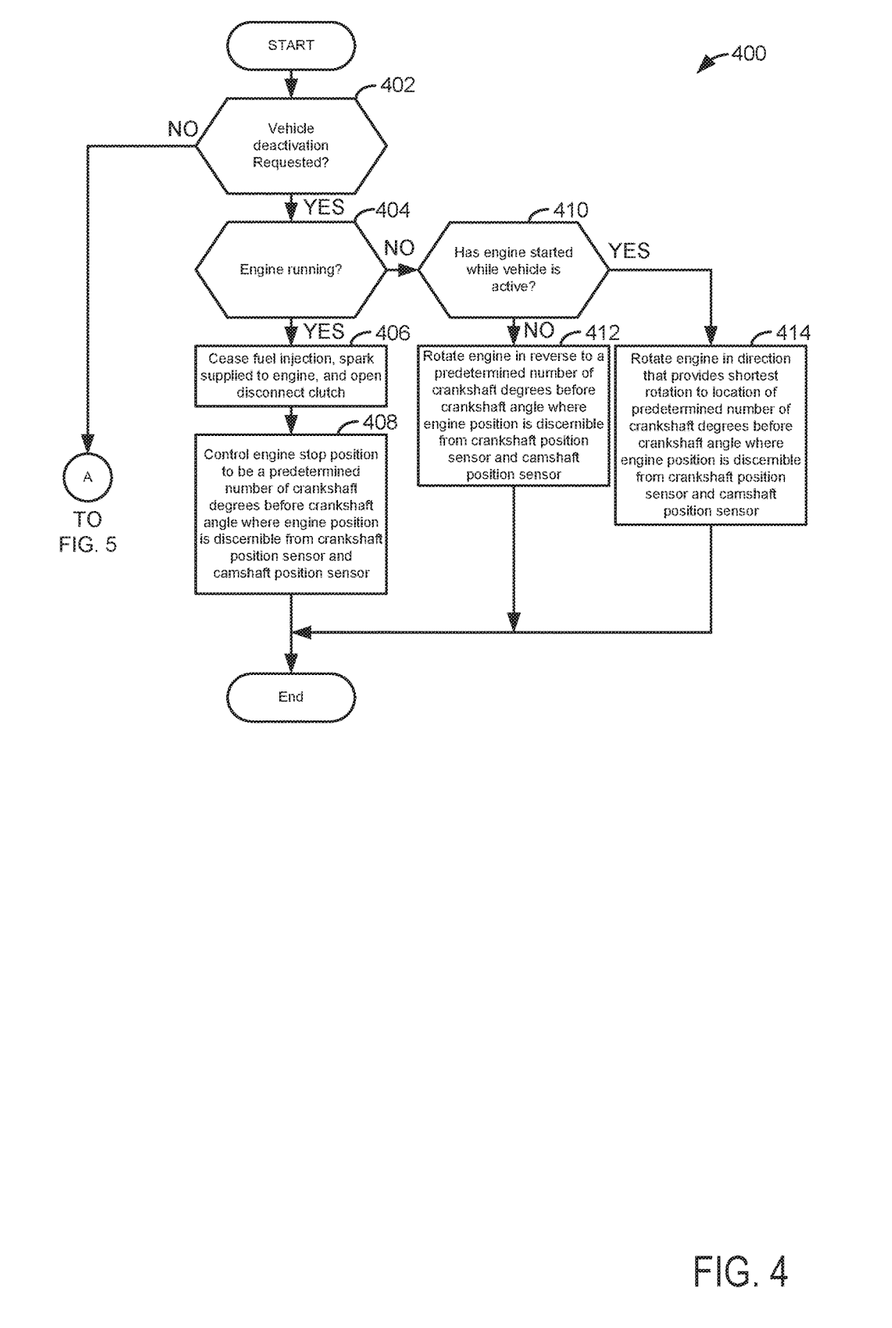
FIGS. 4-6 show and example method for stopping and starting a hybrid vehicle.
Figure 5:
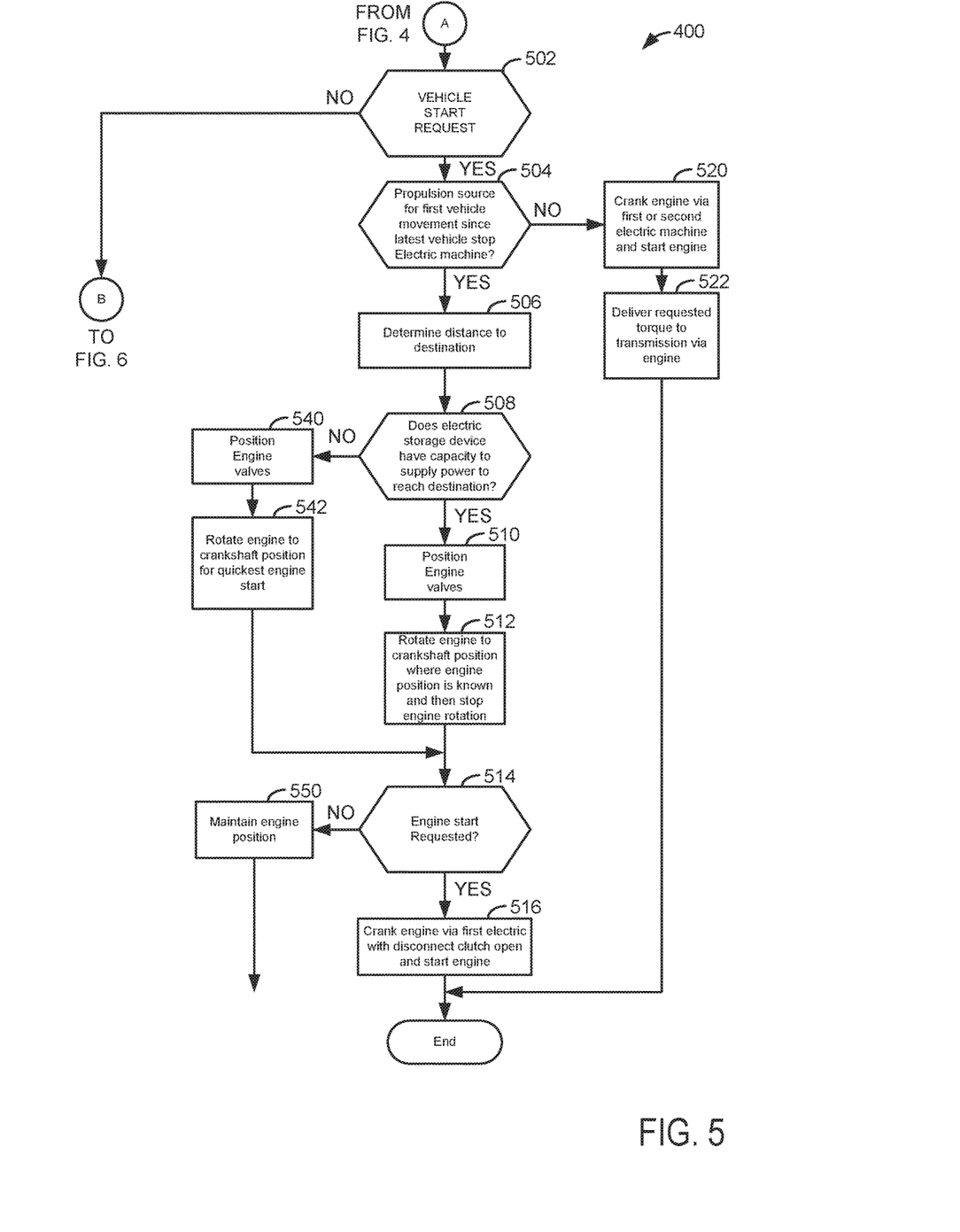
Figure 6:
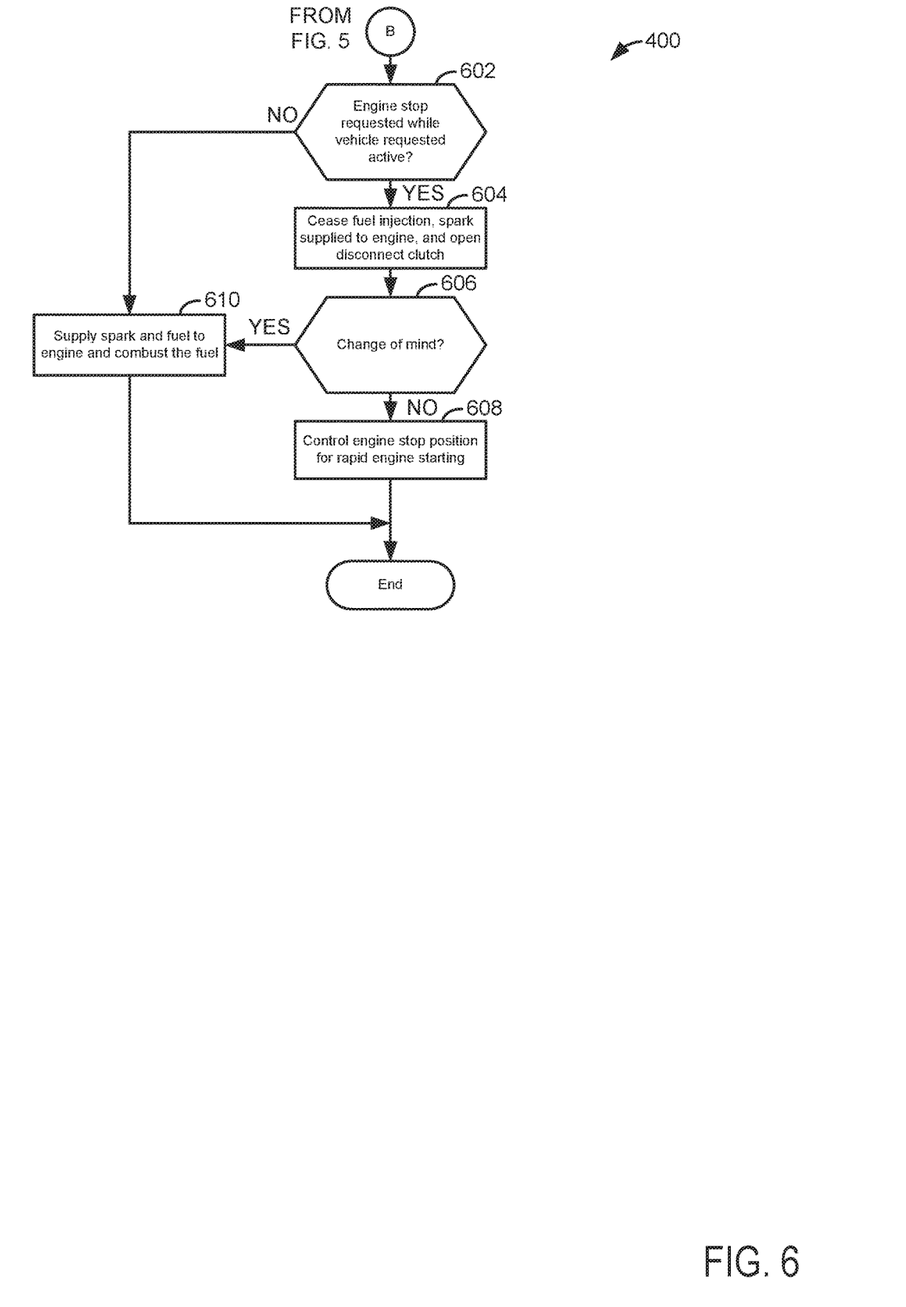

Referring now to FIGS. 4-6, a method for operating a hybrid vehicle is disclosed. The method of FIGS. 4-6 may be incorporated into the system of FIGS. 1 and 2 as executable instructions stored in non-transitory memory. Additionally, portions of the method of FIGS. 4-6 may be acts performed via the controller shown in FIGS. 1 and 2 to transform a state of a device or actuator in the real world.

At 402, method 400 judges if vehicle deactivation is requested. Vehicle deactivation may be requested when a vehicle reaches its destination or in response to vehicle occupants requesting vehicle deactivation. The vehicle's engine may stop rotating and power supplied to an electric machine to propel the vehicle may cut off or stopped when the vehicle is deactivated. If method 400 judges that vehicle deactivation is requested, the answer is yes and method 400 proceeds to 404. Otherwise, the answer is no and method 400 proceeds to 502 of FIG. 5.

At 404, method 400 judges if the vehicle's engine is running (e.g., rotating and combusting air and fuel). Method 400 may judge that the engine is running if engine speed is greater than a threshold speed. If method 400 judges that the engine is running, the answer is yes and method 400 proceeds to 406. Otherwise, the answer is no and method 400 proceeds to 410.

At 406, method 400 ceases to inject fuel to engine cylinders, ceases to supply spark to engine cylinders, and opens the driveline disconnect clutch. The driveline disconnect clutch is opened so that the engine may be subsequently started after the vehicle is reactivated and the ISG is rotating. Method 400 proceeds to 408.

At 408, method 400 controls the engine's stopping position to be a predetermined number of crankshaft degrees before a crankshaft position where engine position is discernable or determinable from crankshaft position sensor output and camshaft position sensor output. For example, as shown in FIG. 3, engine position may be controlled during engine stop to the position indicated by arrow 310, which is a predetermined actual total number of crankshaft degrees before engine position may be discerned at 302. By stopping the engine before location 302, engine speed may be high enough after engine rotation begins for engine starting so that engine position may be determined via camshaft sensor output and crankshaft sensor output at 302. Further, engine position is controlled so that crankshaft sensor output and camshaft sensor output do not miss indicating the camshaft and crankshaft features at 360 crankshaft degrees. Alternatively, the engine position may be controlled to stop at location 305 of FIG. 3 so that engine position may be determined at 306. Method 400 proceeds to exit.

At 410, method 400 judges if the engine has been running while the vehicle has been active during the vehicle's most recent activation period. In one example, a bit or word in memory may provide an indication as to whether or not the engine has been running (e.g., combusting air and fuel while rotating). For example, the bit may have a value of one if the engine has been running or a value of zero if the engine has not been running. If method 400 judges that the engine has been running, the answer is yes and method proceeds to 414. Otherwise, the answer is no and method 400 proceeds to 412.

At 412, method 400 rotates the engine in a reverse direction (e.g., a direction the engine rotates while combusting air and fuel) for a predetermined actual total number of crankshaft degrees. The engine is rotated in reverse via the BISG to a position that is a predetermined actual total number of crankshaft degrees before a crankshaft position where engine position is discernable or determinable via output from crankshaft and camshaft position sensors. The engine is rotated in reverse so that engine position may be determined quickly while rotating the engine in a forward position during engine starting. For example, if the engine were stopped at a crankshaft angle and camshaft angle where camshaft and crankshaft position sensor output transitions from one state to another state to indicate engine position at a threshold engine speed, engine position may not be discernable or determinable at the engine position (e.g., 0 crankshaft degrees) when engine activation is requested because engine speed is zero and sensor output may not provide discernable engine position data at engine speeds less than a threshold. Therefore, the engine is rotated to an engine position before the engine position where engine position is discernable so that sensors may provide more reliable output and so that the engine position where engine position is discernable based on sensor output is not missed when engine rotation for starting begins. The engine is reverse rotated after the engine has not been started so that engine position may be reliably determined in a short crankshaft rotation interval if the vehicle is subsequently reactivated. Method 400 proceeds to exit.

At 414, method 400 rotates the engine in a direction of an engine position that is closest to an engine position that is within a predetermined actual total number of crankshaft degrees where engine position may be determined when rotating the engine in a direction the engine rotates while combusting air and fuel. For example, if engine position is at 303 shown in FIG. 3, the engine is rotated in a direction reversed from a direction the engine rotates while combusting air and fuel. The engine is reverse rotated to 301 of FIG. 3. However, if the engine position is at 305 of FIG. 3, the engine is rotated forward to 306 of FIG. 3. Thus, the engine is rotated in a direction that is shortest to a position that is a predetermined actual total number of crankshaft degrees before or retarded from an engine position where engine position may be determined based on crankshaft and camshaft sensor output. In this way, the energy consumed to position the engine for starting may be reduced. Method 400 proceeds to exit.

At 502 of FIG. 5, method 400 judges if there is a vehicle activation request. The vehicle activation request may be made by a person or via a controller. A person may request vehicle activation via entering the vehicle and pressing a button or turning a key. If method 400 judges that vehicle activation is being requested, the answer is yes and method 400 proceeds to 504. Otherwise, the answer is no and method 400 proceeds to 602.

At 504, method 400 judges if the first active propulsion source providing torque to propel the vehicle since the last vehicle deactivation is solely an electric machine (e.g., ISG 240). The ISG may be activated to propel the vehicle when battery state of charge (SOC) is greater than a threshold level and driver demand torque is less than a threshold level. If method 400 judges that the electric machine is the sole propulsion source the answer is yes and method 400 proceeds to 506. Otherwise, the answer is no and method 400 proceeds to 520.

At 520, method 400 cranks the engine via the BISG or the ISG and starts the engine. The driveline disconnect clutch is open if the BISG cranks (e.g., rotates the engine at 250 RPM) the engine. The driveline disconnect is at least partially closed if the ISG cranks and starts the engine. Spark and fuel are also delivered to the engine to start the engine. Method 400 proceeds to 522.

At 522, method 400 delivers a driver demand torque or a requested torque to the vehicle's driveline via the engine or the engine and the ISG. The driver demand torque may be based on a position of an accelerator pedal and vehicle speed. Requested torque may be torque requested via a controller. Method 400 proceeds to exit after delivering the requested torque or driver demand torque.

At 506, method 400 determines a distance to a destination. The vehicle's present position may be determined via a global positioning system and the destination may be a destination requested via a vehicle passenger or a vehicle controller. The distance to the vehicle's destination may be determined via charting a path from the vehicle's present position to its destination via maps stored within the controller. Distances traveled over one or more roads to reach the vehicle's destination are summed to determine a distance to the destination. Method 400 proceeds to 508 after the distance to the vehicle's destination is determined.

At 508, method 400 judges whether or not the vehicle's electric storage device has sufficient charge stored to reach the destination. In one example, the vehicle may have an estimate of distance traveled per unit vehicle electrical power consumption stored in memory. The distance to the destination may be divided by the vehicle's distance traveled per unit power consumption to estimate an amount of electrical power to travel the desired distance. If the electric energy storage device includes the amount of power to reach the vehicle's destination (e.g., from a single charging session where the electric energy device is fully charged via an electrical grid), the answer is yes and method 400 proceeds to 510. Otherwise, the answer is no and method 400 proceeds to 440.

At 540, method 400 position valves to reduce the energy to rotate the engine. In one example, the engine's exhaust valves are opened and held in an open state while the engine rotates. The exhaust valves may be held open via an electrical actuator, a hydraulic actuator, or a mechanical actuator. Further, in some examples, the intake valves may be held closed while the exhaust valves are held open as the engine is rotated via the BISG to preposition the engine for starting. Alternatively, the intake valves may be held closed while the exhaust valves of the engine are allowed to open and close over a cycle of the engine. In these ways, engine pumping work may be reduced while limiting flow of oxygen to the vehicle's catalyst while rotating the engine so that electrical energy to rotate the engine may be reduced. Method 400 proceeds to 542 after intake and/or exhaust valves have been positioned.

At 542, method 400 rotates the engine via the BISG while the driveline disconnect clutch is open. The disconnect clutch is held open so that engine rotation does not interfere with driveline torque production. The engine is rotated to a second position where the engine may be started quickly and past a first position where engine position may be determined. The engine is rotated past the first engine position where engine position is determinable or discernable based on cam sensor and crankshaft sensor output so that engine position may be established before reaching the second position. The engine's position is stored in memory and updated after engine position is determined based on camshaft and crankshaft position sensor outputs. The engine is stopped from rotating when the engine reaches the second engine position for quick starting. In one example, the engine position for quick engine starting is a predetermined number of crankshaft degrees (e.g., 120) before-top-dead center compression stroke of a first cylinder since a last passing of the first position (e.g., the engine position where engine position may be determined via output from a cam sensor and a crankshaft sensor) at a most recent time.

For example, if the engine is a four cylinder engine with a combustion order of 1, 3, 4, 2 and the engine passes zero crankshaft degrees (e.g., the first position) to establish engine position a first time since a last vehicle deactivation, the engine may be rotated an additional 60 crankshaft degrees to position the engine 120 crankshaft degrees before top-dead-center compression stroke of cylinder number 3 (e.g., the second position) for rapid engine starting. Method 400 proceeds to 514.

At 510, method 400 position valves to reduce the energy to rotate the engine. In one example, the engine's exhaust valves are opened and held in an open state while the engine rotates. The exhaust valves may be held open via an electrical actuator, a hydraulic actuator, or a mechanical actuator. Further, in some examples, the intake valves may be held closed while the exhaust valves are held open as the engine is rotated via the BISG to preposition the engine for starting. Alternatively, the intake valves may be held closed while the exhaust valves of the engine are allowed to open and close over a cycle of the engine. In these ways, engine pumping work may be reduced while limiting flow of oxygen to the vehicle's catalyst while rotating the engine so that electrical energy to rotate the engine may be reduced. Method 400 proceeds to 512 after intake and/or exhaust valves have been positioned.

At 512, method 400 rotates the engine via the BISG while the driveline disconnect clutch is open. The disconnect clutch is held open so that engine starting does not interfere with driveline torque production. The engine is rotated to a first position where engine position may be determined and stopped. The engine is rotated to the first engine position where engine position is determinable or discernable based on cam sensor and crankshaft sensor output so that engine position may be established in case the engine is started even though the electric energy storage device may be storing sufficient power to reach the vehicle's destination. The engine may be started in response to a large driver demand torque request or another condition. The engine's position is stored in memory and updated after engine position is determined based on camshaft and crankshaft position sensor outputs incase the engine is restarted. By reducing the amount of engine rotation via rotating the engine to the first position where engine position may be determined based on camshaft and crankshaft sensor output and not the second engine position for fast engine starting, stored electrical energy may be conserved. Method 400 proceeds to 514.

At 514, method 400 judges if an engine start is requested. An engine start may be requested in response to low battery state of charge, driver demand torque greater than a threshold, or other conditions. If method 400 judges that an engine start is requested, the answer is yes and method 400 proceeds to 516. Otherwise, the answer is no and method 400 proceeds to 550.

At 550, method 400 maintains the position of the engine. The engine position is maintained in a first position (e.g., crankshaft angle where engine position may be determined via camshaft and crankshaft sensor output) if the vehicle's electrical storage device has stored sufficient power for the vehicle to reach its destination solely via the electrical machine propelling the vehicle with the stored charge and no additional charging sessions. The engine position may be maintained in a second position if the vehicle's electrical storage device has stored insufficient power for the vehicle to reach its destination. The engine position may be maintained by not cranking the engine and not supplying spark and fuel to the engine. Method 400 proceeds to exit.

At 516, method 500 cranks the engine via the BISG while the driveline disconnect clutch is open. The driveline disconnect clutch is opened so that the engine may rotate at a speed different than ISG speed until the engine is started without slipping the driveline disconnect clutch. The engine is cranked (e.g., rotated) and spark and fuel are supplied to the engine. Method 400 proceeds to exit after the engine is started.

At 602 of FIG. 6, method 400 judges if an engine stop is requested while the vehicle is active. The ISG may continue to provide torque to vehicle wheels while the engine is stopped. An engine stop may be requested in response to a decrease in driver demand torque, electric energy storage device SOC greater than a threshold, or other vehicle conditions. If method 400 judges that an engine stop is requested, the answer is yes and method 400 proceeds to 604. Otherwise, the answer is no and method 400 proceeds to 610.

At 610, method 400 continues to operate the engine its current state. For example, if the engine is running and combusting air and fuel, the engine continues to run and combust air and fuel. If engine rotation is stopped and the engine is not combusting air and fuel, the engine remains stopped and not rotating. Method 400 proceeds to exit.

At 604, method 400 ceases fuel injection and spark supplied to the engine. Further, the driveline disconnect clutch is opened so that the ISG does not have to rotate the engine. The engine begins to decelerate toward zero rotation. Method 400 proceeds to 606.

At 606, method 400 judges if there is an operator change of mind (e.g., a person changes their mind and wishes for the engine to continue operating). A change of mind may be determined via accelerator pedal position or via a different input by a vehicle occupant. For example, if a driver applies an accelerator pedal after the engine stop request is made, but before engine speed is zero, a change of mind may be determined to have occurred. If method 400 determines that a change of mind is present, the answer is yes and method 400 proceeds to 610. Otherwise, the answer is no and method 400 proceeds to 608.

At 608, method 400 controls the engine to a stopping position (e.g., where the engine is not rotating) for rapid engine starting. The engine may be controlled to the position for rapid engine starting via the BISG controlling engine position after spark and fuel delivery to the engine cease. The engine position for rapid starting may be 120 crankshaft degrees before top-dead-compression stroke of a cylinder. Method 400 proceeds to exit.

Figure 7:
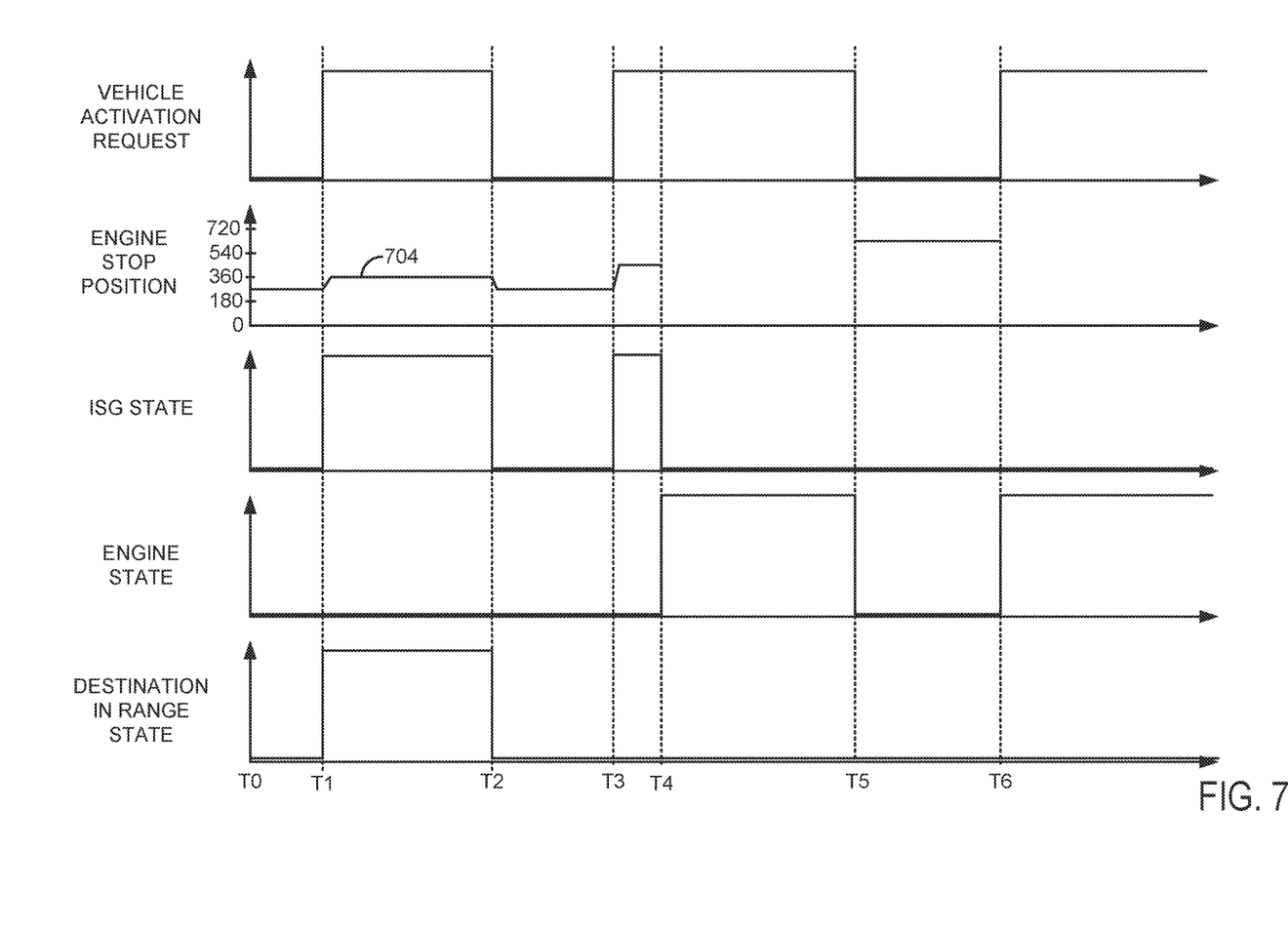
FIG. 7 shows an example hybrid vehicle operating sequence.

Referring now to FIG. 7, an example prophetic engine operating sequence is shown. The sequence of FIG. 7 may be provided via the system of FIGS. 1 and 2 and the method of FIGS. 4-6. The plots shown in FIG. 7 are aligned in time and occur at a same time. Vertical lines at T1-T6 represent times of interest in the sequence. The engine operating sequence is for a four cycle four cylinder engine having a firing order of 1-3-4-2.

The first plot from the top of FIG. 7 is a plot of a vehicle activation request state versus time. The vertical axis represents vehicle activation request state and the vehicle activation request is present when the trace is at a higher level near the vertical axis arrow. The horizontal axis represents time and time increases from the left side of the figure to the right side of the figure. A vehicle activation request is not asserted when the trace is at a lower level near the horizontal axis.

The second plot from the top of FIG. 7 is a plot of engine stop position (e.g., the engine position where the engine stops rotating) versus time. The vertical axis represents engine stop position and the engine stop position is indicated in crankshaft degrees ranging from 0 to 720. Position 0 represents top-dead-center compression stroke for engine cylinder number one. The horizontal axis represents time and time increases from the left side of the figure to the right side of the figure. Trace 704 is not visible when the engine is rotating.

The third plot from the top of FIG. 7 is a plot of ISG state (e.g., 240 of FIG. 2) versus time. The vertical axis represents ISG state and the ISG state is active (e.g., the ISG may provide torque to the driveline or absorb torque from the driveline when active) when the trace is at a higher level near the vertical axis arrow. The horizontal axis represents time and time increases from the left side of the figure to the right side of the figure. The ISG is not requested to be active when the trace is at a lower level near the horizontal axis.

The fourth plot from the top of FIG. 7 is a plot of engine state versus time. The vertical axis represents engine state and the engine is active and combusting air and fuel when the trace is at a higher level near the vertical axis arrow. The horizontal axis represents time and time increases from the left side of the figure to the right side of the figure. The engine is not activated when the trace is at a lower level near the horizontal axis.

The fifth plot from the top of FIG. 7 is a plot of vehicle destination within range state. If the vehicle's destination is in range of the vehicle's capacity to reach the destination based solely on energy stored in the electrical energy storage device during a single charging event or session (e.g. receiving charge from a grid until the electric energy storage device is fully charged), the vehicle within range state trace is at a higher level near the vertical axis arrow. If the vehicle's destination is not in range of the vehicle's capacity to reach the destination based solely on energy stored in the electrical energy storage device during the single charging event or session, the vehicle within range state trace is at a lower level near the horizontal axis. The vertical axis represents vehicle destination within range state. The horizontal axis represents time and time increases from the left side of the figure to the right side of the figure.

At time T0, the vehicle activation request is not asserted indicating that the vehicle is not activated. The engine stop position is 120 crankshaft degrees before 180 crankshaft degrees indicating the engine is stopped in a position for quick starting the engine via cylinder number three (cylinder number three top-dead-center location is 180 crankshaft degrees since there is 180 crankshaft degrees between top-dead-center locations). The ISG (e.g., 240 in FIG. 2) is also deactivated at time T0 as indicated by the ISG state. Likewise, the engine is deactivated as indicated by the engine state. The vehicle is not within range of its destination.

At time T1, the vehicle is requested activated. The vehicle may be activated without activating the engine or the ISG. The engine is not requested activated, but the engine is rotated by the BISG (not shown) with the driveline disconnect clutch open (not shown). The engine is rotated to 360 crankshaft degrees via the BISG where engine position is determined based on cam sensor and crankshaft sensor output. The engine rotation is stopped as soon as engine position is determined and the engine position is stored to memory. The ISG is activated at time T1 and it is determined that the vehicle is in range of its destination based on the amount of charge stored in the electric energy storage device.

Between time T1 and time T2, the ISG propels the vehicle to its destination while the engine is stopped as indicated by the engine state and the engine stop position. The vehicle activation request remains asserted while the vehicle travels to its destination.

At time T2, the vehicle reaches its destination and the vehicle activation request is withdrawn. The engine is rotated in reverse to a position a threshold number of crankshaft degrees before a position where engine position may be determined from cam and crankshaft sensors when the engine is rotated in a direction the engine rotates when it is operating and combusting air and fuel. By rotating the engine in reverse, the engine has to travel less distance to determine engine position when the vehicle is reactivated. The engine's position that is stored in memory may not be reliable because of engine movement that may occur while the engine is not activated and because cam and crank sensors are not active when the engine is not activated. The ISG is deactivated and the engine remains deactivated. The vehicle is not within range of its destination since the vehicle has no new destination when it is deactivated.

At time T3, the vehicle activation request is asserted for a second time. The engine is rotated in a forward direction via the BISG to determine engine position at 360 crankshaft degrees, but the engine is rotated further in response to the vehicle destination not being within range of its destination based solely on the power stored in the vehicle's electric energy storage device. The engine is rotated to a position where the engine may be started faster than if the engine was to have remained at 360 crankshaft degrees and then engine rotation stops. The engine is rotated with the BISG while the driveline disconnect clutch is open. The ISG is activated in response to the vehicle activation request and the ISG propels the vehicle. The engine remains deactivated and not combusting air and fuel.

At time T4, the engine is activated as indicated by the engine state transitioning to a higher level. The engine is activated to provide torque to the vehicle driveline. The ISG is deactivated in response to activating the engine. The vehicle remains activated and the engine combusts air and fuel to provide torque to the driveline. The vehicle destination remains not in range over the drive cycle.

At time T5, the vehicle reaches its destination and the vehicle activation request transitions to a lower level so that the vehicle is deactivated. The engine is deactivated as indicated by the engine state and the ISG remains deactivated. The engine position is controlled to stop a predetermined number of degrees before an engine position (e.g., 720 crankshaft degrees as shown in FIG. 3) where engine position may be determined via cam and crankshaft position sensor output when the engine is rotated at a later time.

At time T6, the vehicle is requested activated. The engine is requested activated, but the ISG is not activated. The engine is cranked to 720 crankshaft degrees where engine speed is determined and the engine is then supplied fuel and spark after engine position is determined. The engine is started and the vehicle's destination is not within range based on an amount of power stored in the vehicle's electric energy storage device.

Thus, the engine's stopping position may be based on the vehicle's destination and whether or not the engine has started during a present vehicle activation period. If the vehicle is in range of its destination based solely on the amount of electrical power stored in the electric energy storage device, the engine may be rotated until engine position is known and then engine rotation stops. However, if the vehicle is no in range of its destination based solely on the amount of electrical power stored in the electric energy storage device, the engine may be rotated further until engine position is known and the engine is at a position that promotes faster engine starting.

Thus, the method of FIGS. 4-6 provide for an engine operating method, comprising: after stopping an engine, rotating the engine via an electric machine to a first position and then stopping engine rotation in response to activating a vehicle and the vehicle being within a predetermined distance of a destination. The method includes where the first position is an engine position where engine position may be determined via cam sensor and crankshaft sensor outputs.

The method of FIGS. 4-6 further comprises rotating the engine via the electric machine to a second position after rotating the engine to the first position in response to the vehicle not being within a predetermined distance of the destination. The method includes where the second position is an engine position where engine starting time is reduced as compared to if the engine were started from the first position. The method includes where the electric machine is a belt integrated starter/generator. The method further comprises rotating the engine via the electric machine when a driveline disconnect clutch is open. The method includes where the predetermined distance is based on an amount of electric charge stored in an electric energy storage device.

The method of FIGS. 4-6 also provides for an engine operating method, comprising: stopping an engine; rotating the engine via an electric machine to a first position and then stopping engine rotation in response to activating a vehicle and the vehicle being within a predetermined distance of a destination; and reverse rotating the engine to a second position in response to the engine not being activated during a vehicle activation period. The method includes where the engine is reverse rotated via a belt integrated starter generator while a driveline disconnect clutch is open. The method includes where the first position is an engine position where engine position may be determined via output of a cam sensor and output of a crankshaft sensor. The method includes where the second position is advanced of the first position according to rotating the engine in a direction the engine rotates when combusting air and fuel. The method includes where the engine is stopped at the second position. The method further comprises rotating the engine via the electric machine to a third position after rotating the engine to the first position in response to the vehicle not being within a predetermined distance of the destination. The method further comprises rotating the engine with the engine's intake valves held open and the engine's exhaust valves held closed while rotating the engine to the first position.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
    stopping an engine and deactivating a vehicle via a controller;
    rotating the engine via an electric machine to a first position and then stopping engine rotation, the engine rotated to the first position in response to activating the vehicle via the controller and the controller judging that the vehicle has sufficient charge stored in an electric energy storage device to reach a destination of the vehicle; and
    rotating the engine via the electric machine to a second position and then stopping engine rotation, the engine rotated to the second position in response to activating the vehicle via the controller and the controller judging that the vehicle has insufficient charge stored in the electric energy storage device to reach the destination.

2. The method of claim 1, where the first position is an engine position where engine position may be determined via cam sensor and crankshaft sensor outputs.

3. The method of claim 1, further comprising starting the engine from the first position or the second position.

4. The method of claim 3, where the second position is an engine position where engine starting time is reduced as compared to if the engine were started from the first position.

5. The method of claim 1, where the electric machine is a belt integrated starter/generator.

6. The method of claim 1, further comprising rotating the engine via the electric machine when a driveline disconnect clutch is open.

7. The method of claim 1, further comprising holding intake valves of the engine open and exhaust valves of the engine closed while rotating the engine to the first position and rotating the engine to the second position.

8. An engine operating method, comprising:
    stopping an engine and deactivating a vehicle via a controller;
    rotating the engine via an electric machine to a first position and then stopping engine rotation via the controller, the engine rotated in response to activating the vehicle and the controller judging that the vehicle is within a predetermined distance of a destination; and
    reverse rotating the engine to a second position via the electric machine in response to the engine not being activated during a vehicle activation period.

9. The method of claim 8, where the engine is reverse rotated via a belt integrated starter generator while a driveline disconnect clutch is open.

10. The method of claim 8, where the first position is an engine position where engine position may be determined via output of a cam sensor and output of a crankshaft sensor.

11. The method of claim 10, where the second position is advanced of the first position according to rotating the engine in a direction the engine rotates when combusting air and fuel.

12. The method of claim 8, where the engine is stopped at the second position.

13. The method of claim 8, further comprising rotating the engine via the electric machine to a third position and then stopping the engine before the engine is started for a first time during the vehicle activation period after rotating the engine to the first position in response to the vehicle not being within a predetermined distance of the destination.

14. The method of claim 8, further comprising rotating the engine with intake valves of the engine held open and exhaust valves of the engine held closed while rotating the engine to the first position.

15. A system, comprising:
- an engine;
- an integrated starter/generator selectively coupled to the engine via a driveline disconnect clutch;
- a transmission coupled to the integrated starter/generator; and
- a vehicle system controller including executable instructions stored in non-transitory memory to rotate the engine to a first stopping position based on a vehicle destination or a second position based on the vehicle destination.

16. The system of claim 15, where the first stopping position is based on the vehicle destination being less than a threshold distance from a vehicle in which the engine resides.

17. The system of claim 16, where the second stopping position is based on the vehicle destination being greater than the threshold distance from the vehicle in which the engine resides.

18. The system of claim 17, where the threshold distance is based on an amount of energy stored in an electric energy storage device.

19. The system of claim 15, further comprising a belt integrated starter generator and additional instructions to rotate the engine via the belt integrated starter generator.

20. The system of claim 15, further comprising additional instructions to rotate the engine in a reverse direction in response to the engine not starting during a vehicle activation period.

\* \* \* \* \*